UNITED STATES PATENT OFFICE.

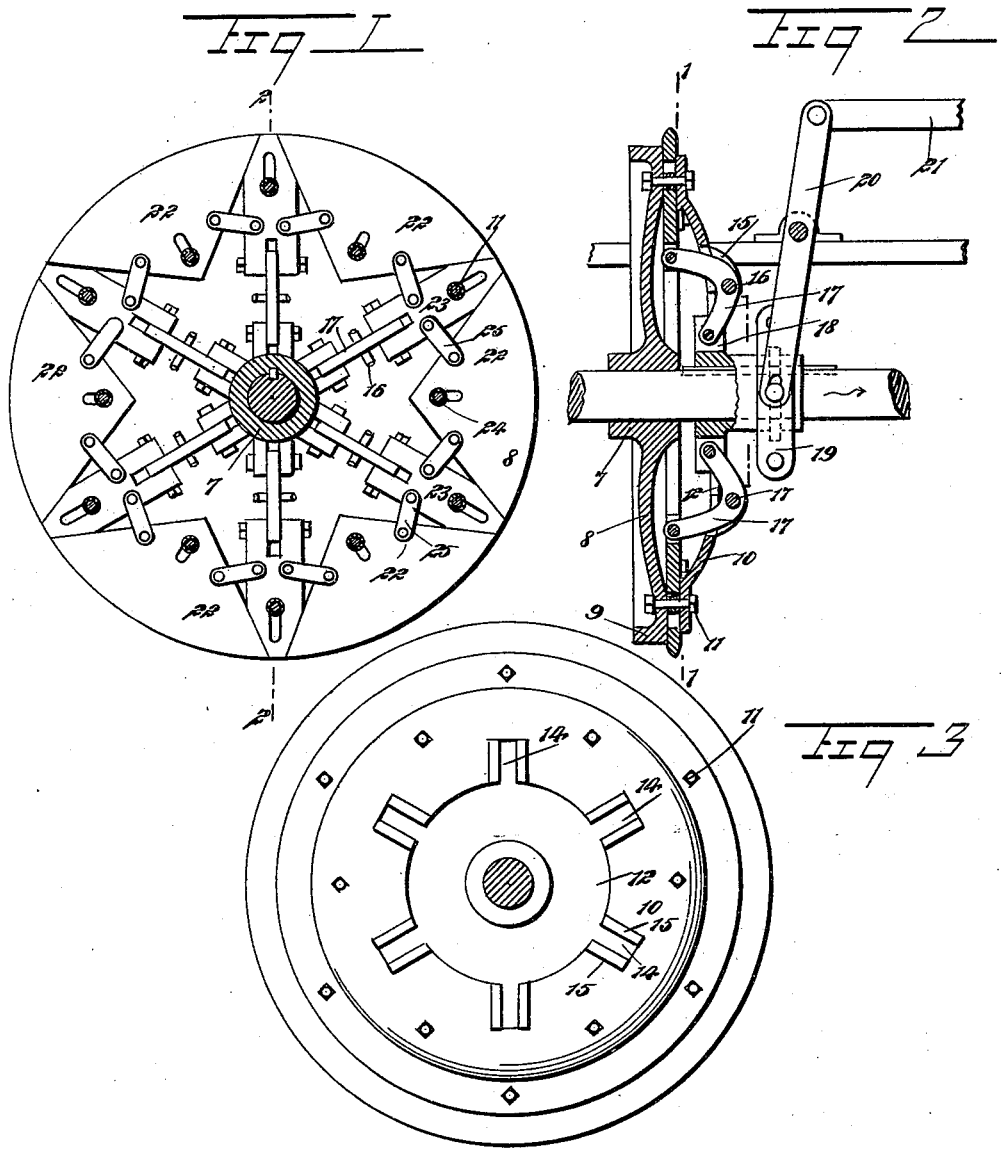

JAMES BURNS, OF CINCINNATI, OHIO.

VEHICLE-WHEEL.

SPECIFICATION forming part of Letters Patent No. 647,941, dated April 24, 1900.

Application filed June 29, 1899. Serial No. 722,266. (No model.)

*To all whom it may concern:*

Be it known that I, JAMES BURNS, of Cincinnati, in the county of Hamilton and State of Ohio, have invented new and useful Improvements in Vehicle-Wheels, of which the following is a full, clear, and exact description.

The purpose of this invention is to provide a vehicle-wheel with a flange which may be adjusted to project outward from the rim or face of the wheel or to extend inside of the rim, thus adapting the wheel to use on rails or on roadways; and the purpose of the invention is also to provide a wheel adapted exclusively for use on roadways, the construction of the wheel being such as to render it stronger and cheaper than other wheels of its class. As an example of a vehicle to which this invention is especially applicable see my application for Letters Patent for running-gear and my application for Letters Patent for a vehicle-body, both filed of even date herewith.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a sectional view of the invention on the irregular line 1 1 of Fig. 2. Fig. 2 is a sectional view on the line 2 2 of Fig. 1; and Fig. 3 is an inner side view of the wheel with certain parts removed.

The invention comprises a hub 7, a web 8, and a rim 9. The wheel is provided, as shown in Figs. 2 and 3, with an inner or auxiliary web 10, secured by bolts and thimbles 11 to the web 8, the webs 8 and 10 being convex, so as to form a chamber between the webs. The auxiliary web 10 is formed with an enlarged central opening 12, having offset portions 14, the offset portions being flanked by lugs 15, forming bearings for the pivots 16 of elbow-levers 17. These levers 17 have their inner ends pivoted to a collar 18, which is splined on the axle, and has a yoke 19 attached thereto, the collar being capable of turning in the yoke, but incapable of sliding independently thereof. The yoke 19 is connected with a lever 20, having suitable connections 21 for throwing the same.

Mounted between the webs 8 and 10 are a number of segmental flange-plates 22, between which are fitted projector-plates 23, the outer ends of which are beveled, as shown, so that the said outer ends will fit snugly against the edges of the flange-plates 22. The projector-plates 23 are mounted to slide radially on the bolts 11, and the flange-plates 22 are mounted to slide in the same manner on bolts 24, similar to the bolts 11. The projector-plates 23 have connection by means of links 25 with the flange-plates 22, and the inner ends of the plates 23 are connected with the outer ends of the respective elbow-levers 17. Now by the movement of these levers caused by the collar 18 the projector-plates 23 may be thrown in or out, carrying with them the flange-plates 22. When the plates 22 and 23 are thrown out, they all lie snugly together to form a continuous flanged wheel, as indicated in Fig. 2, and when the plates are thrown in they lie inside of the rim of the wheel, and the wheel is thus a flangeless one. It will therefore be seen that I provide a wheel with a flange which may be moved in or out, as desired. This enables the wheel to be used as a vehicle which may travel on rails and which, if desired, may move off of the rails and take the roadway. A vehicle so constructed I will term a "supermotor."

Having thus described my invention, I claim as new and desire to secure by Letters Patent—

1. A wheel, having a hub, a web and a rim joined rigidly, flange-plates mounted to move radially on the wheel, projector-plates having connection with the flange-plates, elbow-levers connected with the projector-plates, and means for throwing the elbow-levers to move the flange and projector plates in and out.

2. The combination with a wheel, of a plurality of segmental plates mounted at the periphery thereof and movable radially to a point beyond the same, a plurality of projector-plates fitted between the respective segmental plates and adapted to move therewith to fill the spaces between the segmental plates when in projected position, and means for moving the several plates in unison.

3. The combination with a wheel, of a plurality of segmental plates mounted near the periphery thereof and capable of projecting out beyond the same, a number of projector-plates mounted between the several segmental plates and moving therewith to fill the spaces between the said segmental plates, links connecting the several plates with each other to move in unison, and means mounted on the wheel and connected with some of the plates, whereby to move all of the plates in or out.

4. In a wheel, the combination with the hub, the web and the rim, of an auxiliary web mounted on the wheel and spaced from the main web, flange-plates mounted between the webs and movable outward beyond the rim of the wheel, and means for actuating the flange-plates.

JAMES BURNS.

Witnesses:
JOHN H. COSTELLO,
JOHN DONEGAN.